(12) United States Patent
Jones et al.

(10) Patent No.: US 9,915,156 B2
(45) Date of Patent: Mar. 13, 2018

(54) DEVICE AND METHOD FOR COOLING ELECTRIC DEVICE HAVING MODULAR STATORS

(71) Applicant: Moog Inc., East Aurora, NY (US)

(72) Inventors: Franklin B. Jones, Shrewsbury, MA (US); Stuart A. Jones, Duxbury, MA (US); Andrew I. Nehring, Northborough, MA (US)

(73) Assignee: Moog Inc., East Aurora, NY (US)

( * ) Notice: Subject to any disclaimer, the term of this patent is extended or adjusted under 35 U.S.C. 154(b) by 1072 days.

(21) Appl. No.: 13/886,567

(22) Filed: May 3, 2013

(65) Prior Publication Data

US 2013/0294899 A1 Nov. 7, 2013

Related U.S. Application Data

(60) Provisional application No. 61/642,773, filed on May 4, 2012.

(51) Int. Cl.
*H02K 1/20* (2006.01)
*H02K 9/19* (2006.01)
(Continued)

(52) U.S. Cl.
CPC .............. *F01D 9/00* (2013.01); *H02K 1/148* (2013.01); *H02K 1/20* (2013.01); *H02K 3/522* (2013.01);
(Continued)

(58) Field of Classification Search
CPC .. H02K 9/19; H02K 9/22; H02K 1/20; H02K 1/148; H02K 3/487; H02K 29/03; H02K 2203/12; F01D 9/00
(Continued)

(56) References Cited

U.S. PATENT DOCUMENTS 5,091,666 A * 2/1992 Jarczynski ............... H02K 9/22
310/52
5,094,666 A   2/1992 Jarczynski
(Continued)

FOREIGN PATENT DOCUMENTS

EP    2385609      11/2011
JP    61042264 A    2/1986
(Continued)

OTHER PUBLICATIONS

Owada et al. (JP 2002369418 A) English Translation.*
(Continued)

*Primary Examiner* — Quyen Leung
*Assistant Examiner* — Robert E Mates
(74) *Attorney, Agent, or Firm* — Hodgson Russ LLP

(57) ABSTRACT

An annular stator assembly includes a plurality of stator segments. Each stator segment includes a plurality of laminates having magnetic permeable properties; a plurality of thermally conductive laminates positioned between the permeable laminates; and a cooling pipe extending through the laminates for transferring heat from the laminates to coolant flowing through the cooling pipe. The stator segments are constructed independently. Coils are wound on each segment. The stator segments with the wound coils are subsequently arranged to form the annular stator assembly.

9 Claims, 13 Drawing Sheets

(51) Int. Cl.
*H02K 9/22* (2006.01)
*F01D 9/00* (2006.01)
*H02K 1/14* (2006.01)
*H02K 3/52* (2006.01)

(52) U.S. Cl.
CPC .............. *H02K 9/19* (2013.01); *H02K 9/22* (2013.01); *H02K 2203/12* (2013.01); *Y10T 29/49236* (2015.01)

(58) Field of Classification Search
USPC ............. 310/54, 58, 59, 216.008, 216.009, 310/216.016, 216.017, 214, 215, 260, 270
See application file for complete search history.

(56) References Cited

U.S. PATENT DOCUMENTS

| | | | | |
|---|---|---|---|---|
| 5,757,100 | A * | 5/1998 | Burgbacher | H02K 21/02 29/596 |
| 5,822,150 | A * | 10/1998 | Kelsic | G11B 19/2009 360/98.07 |
| 6,590,310 | B2 * | 7/2003 | Takano | H02K 3/522 29/596 |
| 6,847,137 | B2 * | 1/2005 | Furuse | H02K 16/00 310/58 |
| 6,941,638 | B2 | 9/2005 | Hartsfield, Jr. et al. | |
| 7,626,304 | B2 * | 12/2009 | Morioka | H02K 3/325 29/609 |
| 2004/0189136 | A1 | 9/2004 | Kolomeitsev | |
| 2004/0189137 | A1 * | 9/2004 | Hashimoto | H02K 29/03 310/402 |
| 2004/0245883 | A1 | 12/2004 | Mitcham | |
| 2009/0085422 | A1 * | 4/2009 | Kusawake | H02K 1/148 310/216.067 |
| 2009/0127970 | A1 * | 5/2009 | Tatematsu | H02K 1/02 310/216.067 |
| 2009/0218900 | A1 | 9/2009 | Dickes | |
| 2011/0304229 | A1 | 12/2011 | Pedersen | |
| 2012/0074798 | A1 | 3/2012 | Bywaters et al. | |
| 2012/0104885 | A1 * | 5/2012 | Cominetti | H02K 3/12 310/71 |

FOREIGN PATENT DOCUMENTS

| | | | |
|---|---|---|---|
| JP | 06054469 | A | 2/1994 |
| JP | 2002369418 | | 12/2002 |
| JP | 2002369418 | A * | 12/2002 |
| JP | 2004248429 | | 9/2004 |
| JP | 2009240113 | A * | 10/2009 |
| JP | 2011217434 | | 10/2011 |

OTHER PUBLICATIONS

Fukushima (JP 2009240113 A) English Translation.*
Owada (JP 2002369418 A) English Translation.*
International Search Report and Written Opinion in related international patent application No. PCT/US13/39443, dated Sep. 25, 2013; 12 pages.
Welch, Think Thermal to Increase Motor Efficiency, Inet, http://exlar.com/content/uploads/2014/09/Think-Thermal-To-Increase-Motor-Efficiency.pdf Aug. 1, 2009.
Presher, Optimized Stator Design, http://designnews.com/document.asp?doc_id=228969 Dec. 4, 2010.
Mraz, Segmented Stator for Extra Torque, Machine Design, Penton Media, Cleveland, OH, vol. 74, No. 23, p. 50. Dec. 12, 2002.
Wrobel et al., Thermal Modeling of a Segmented Stator Winding Design, IEEE Transactions on Industry Applications, IEEE Service Center, Piscataway, NJ, US, vol. 47, No. 5, pp. 2023-2030. Sep. 1, 2011.

* cited by examiner

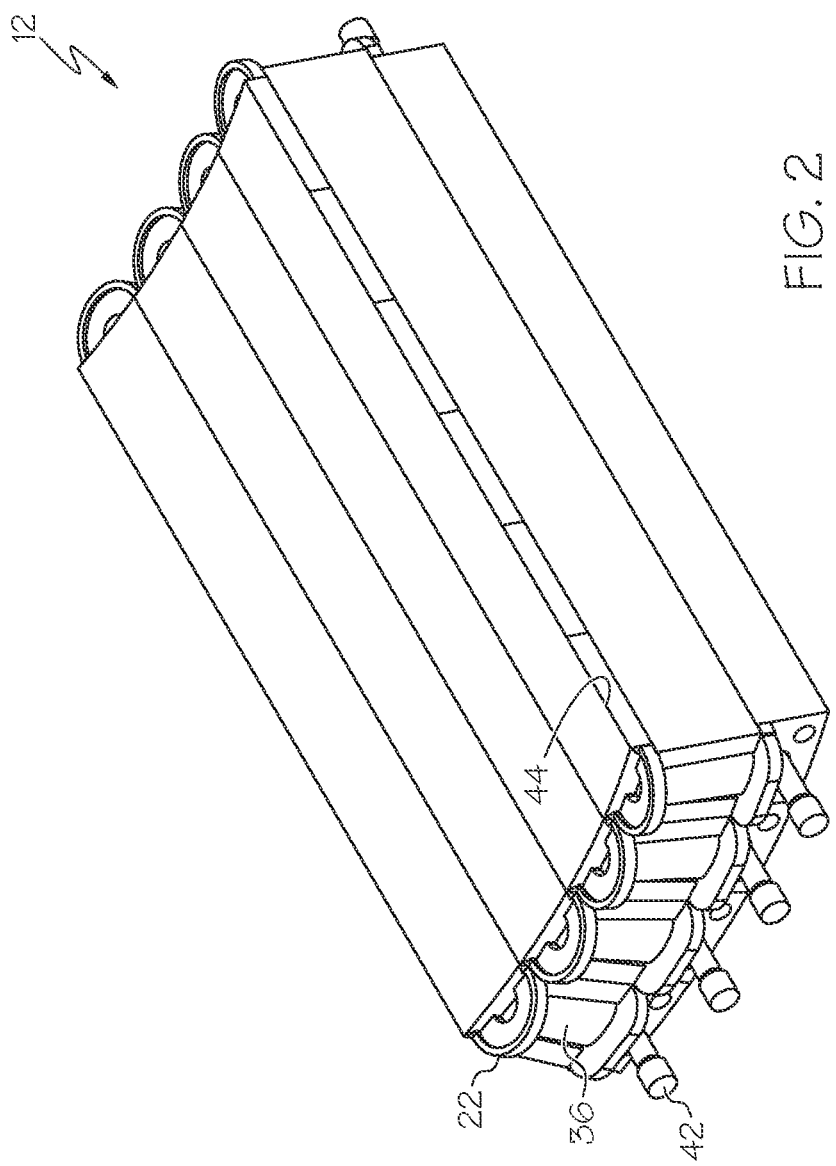

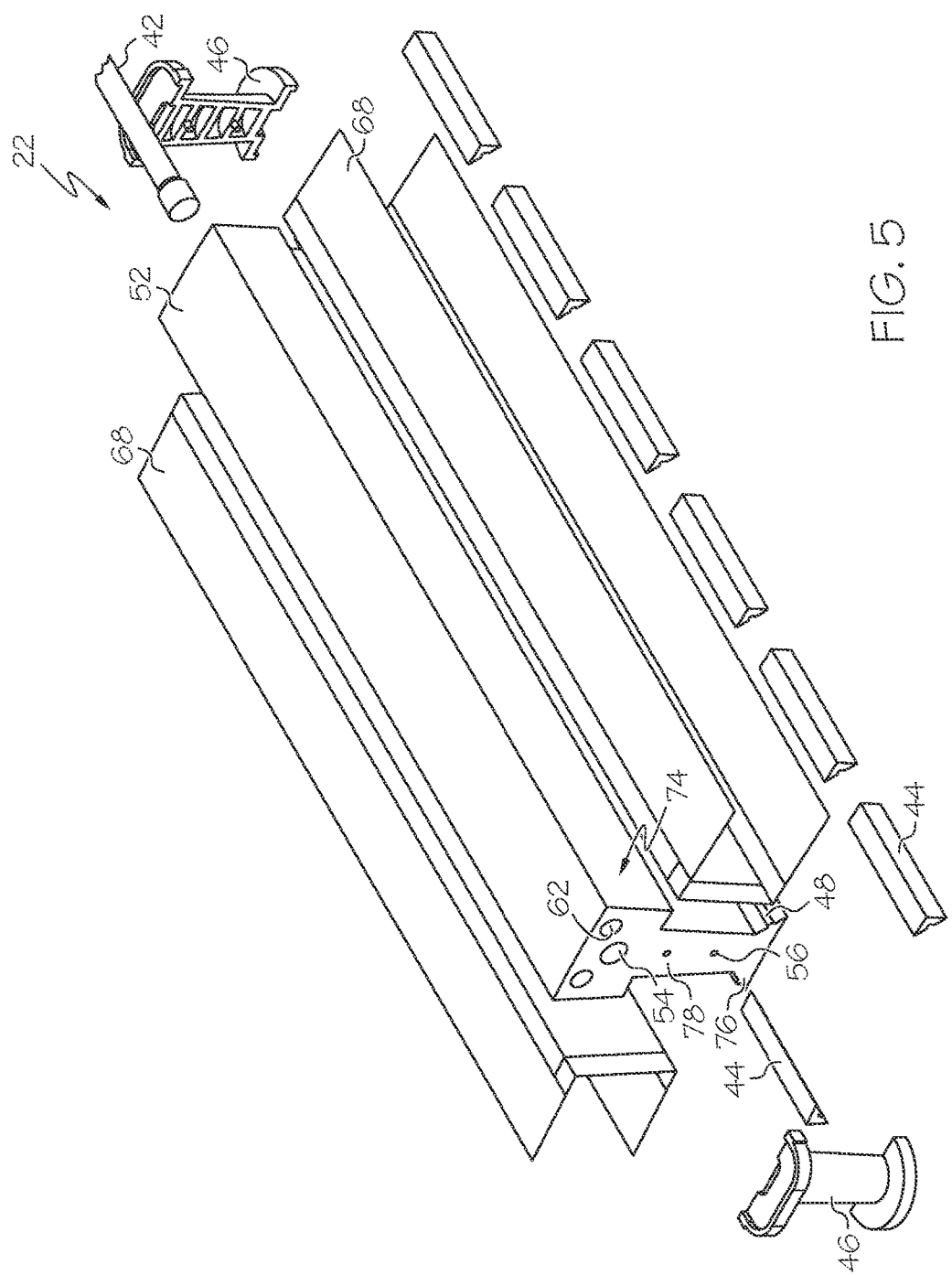

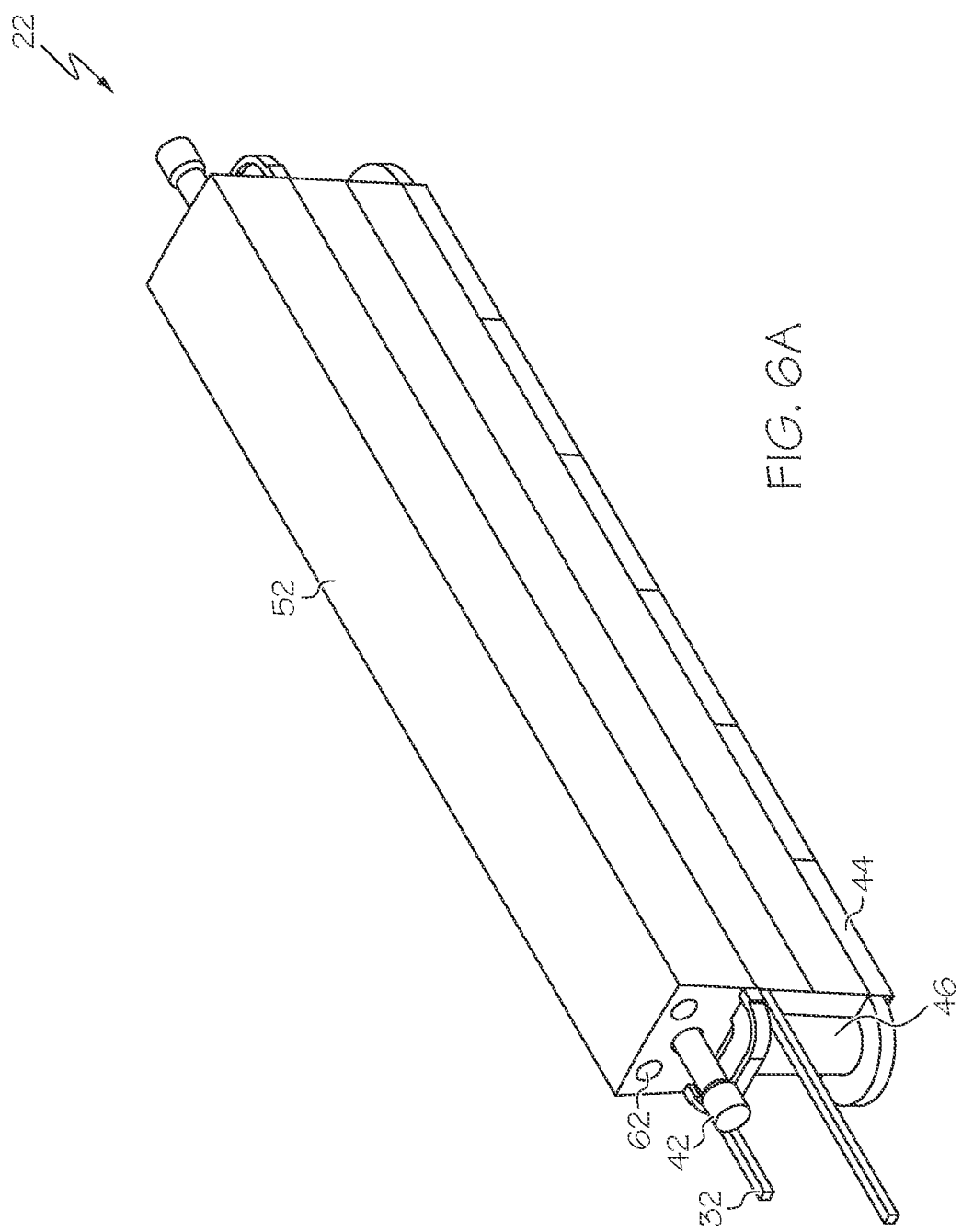

DEVICE AND METHOD FOR COOLING ELECTRIC DEVICE HAVING MODULAR STATORS

FIELD OF THE INVENTION

The present invention relates generally to permanent magnet motors. More particularly, the present invention relates to the thermal behavior of a modular stator segment of a permanent magnet motor.

BACKGROUND OF THE INVENTION

A permanent magnet motor typically consists of a wound stator within which a rotor rotates. The stator can be partitioned into modules or segments, where each segment includes a conductive coil. As current passes through the segment coil windings, a magnetic field is established that produces torque and rotates the rotor.

SUMMARY OF THE INVENTION

In accordance with an aspect, provided is an annular stator assembly, comprising a plurality of stator segments. Each stator segment includes a plurality of laminates having high magnetic permeability and a plurality of thermally conductive laminates positioned between the permeable laminate; and a cooling pipe integrated into the laminates for transferring thermal energy from the laminates to a coolant flowing through the cooling pipe. In an embodiment, the stator segments are constructed independently whereby coils are wound at each segment. In an embodiment, the stator segments with the wound coils are arranged to form the annular stator assembly. Accordingly, manufacturing-related risks can be reduced according to the modular configuration of the stator assembly.

In another aspect, provided is a stator segment, comprising a core that includes a lamination stack. The stack comprises a plurality of magnetically permeable laminates, wherein at least one thermally conductive laminate positioned between the magnetic permeable laminates; and at least one cooling passage integral to, and extending through, the lamination stack. A conduction path is formed that carries thermal energy through the lamination stack to the at least one cooling passage extending through the lamination stack.

In another aspect, provided is an annular stator assembly, comprising: a plurality of stator segments. Each stator segment comprises a core comprising a plurality of laminates having high magnetic permeability and a plurality of thermally conductive laminates positioned between the permeable laminates; and a cooling pipe integrated into the laminates for transferring thermal energy from the laminates to a coolant flowing through the cooling pipe.

In another aspect, provided is a method of forming an annular stator assembly. A plurality of stator segments is provided, each having a lamination stack comprising a plurality of laminates having high magnetic permeability and a plurality of thermally conductive laminates positioned between the permeable laminates and a cooling pipe integrated into the laminates for transferring thermal energy from the laminates to the cooling pipe. An end cap is attached to an end of each stator segment. One or more coils are wound directly onto small portions of a complete stator, and later assembled. The stator segments are assembled into a ring to form a stator.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

FIG. 2 is an expanded perspective view of a region of the stator of FIG. 1 including a plurality of stator segments connected to each other, in accordance with an embodiment;

FIG. 5 is an exploded view of the stator segment of FIGS. 4A and 4B;

FIG. 6A is a perspective view of a stator segment, in accordance with another embodiment;

DETAILED DESCRIPTION OF THE INVENTION

Figure 1A:
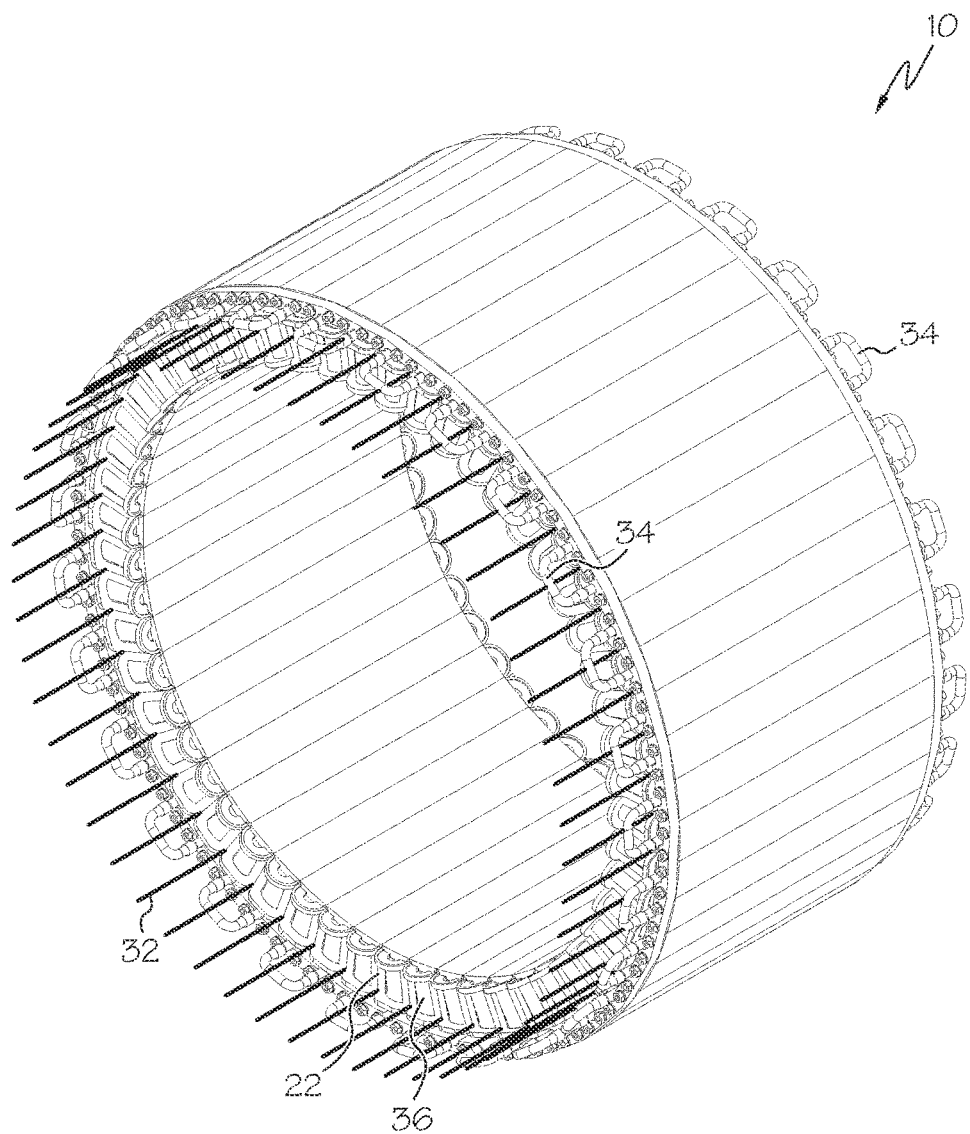
FIG. 1A is a perspective view of a stator, in accordance with an embodiment.

The present invention provides for electric devices such as permanent magnet motors constructed and arranged to include a plurality of stator segments. Each stator segment includes a plurality of first laminates having a thermal conductivity and a plurality of second laminates having a thermal conductivity that is greater than the first laminates. At least one liquid cooling passage is provided that is integral to the stator laminate stack. In an embodiment, a liquid cooling tube extends through the laminates for removing thermal energy, thereby reducing the number of thermal interfaces in the heat transfer path between a stator coil and the cooling passages.

In an embodiment, one or more coils are wound directly onto small portions of a complete stator, and later assembled. This reduces the risk of damage during construction, as well as for a higher packing factor of winding and core, as there no longer needs to be space allocated to insert the coil into the stator. This also simplifies the installation of insulation between the coil and the core. An individual stator segment can be insulated, wound, and then compacted and cured with resin to ensure a good thermal path from the coil through the insulator to the core and the thermal laminates, and then directly into the integral coolant tube and the coolant. This simplified thermal path allows the coils to receive additional current, and therefore the motor can create more torque than otherwise occurring under a standard cooling method. During formation, the coil can be compacted and cured with resin to create a highly thermally conductive assembly. This compaction eliminates the air remaining inside the coil, and ensures that any voids are filled with resin, which has a much higher thermal conductivity. This prevents any high thermal resistance contact areas between the different parts of the coil and the laminated core.

In an embodiment, a slot at the core is prepared by adding plastic components that substantially fill surrounding areas and/or create rounded surfaces on the ends. Here, an end cap and neighboring border sections can collective form a trim. This permits the coil to be wound in place. In other embodiments, a separately wound coil is installed In an embodiment, a plurality of stator segments is bolted into place on a ring to form a stator. Features related to keying and/or retention may be necessary, and may be replaced by dovetail slots or other design features.

In accordance with aspects of the present inventive concepts, a stator is provided that can be manufactured more quickly than a conventional stator. The thermal behavior of the stator in accordance with embodiments allows for a much smaller stator, and the segmented design makes parallel manufacturing an option. The parts being handled for most of the assembly process are also much smaller, simplifying the equipment needed. Should the stator require repair, segmented stator construction allows for one segment to be removed and replaced while preserving the rest of the stator. Like laminates can be used to create stators of any given diameter and length, allowing new designs to be created with minimal magnetic design, analysis, and testing.

Figure 1B:
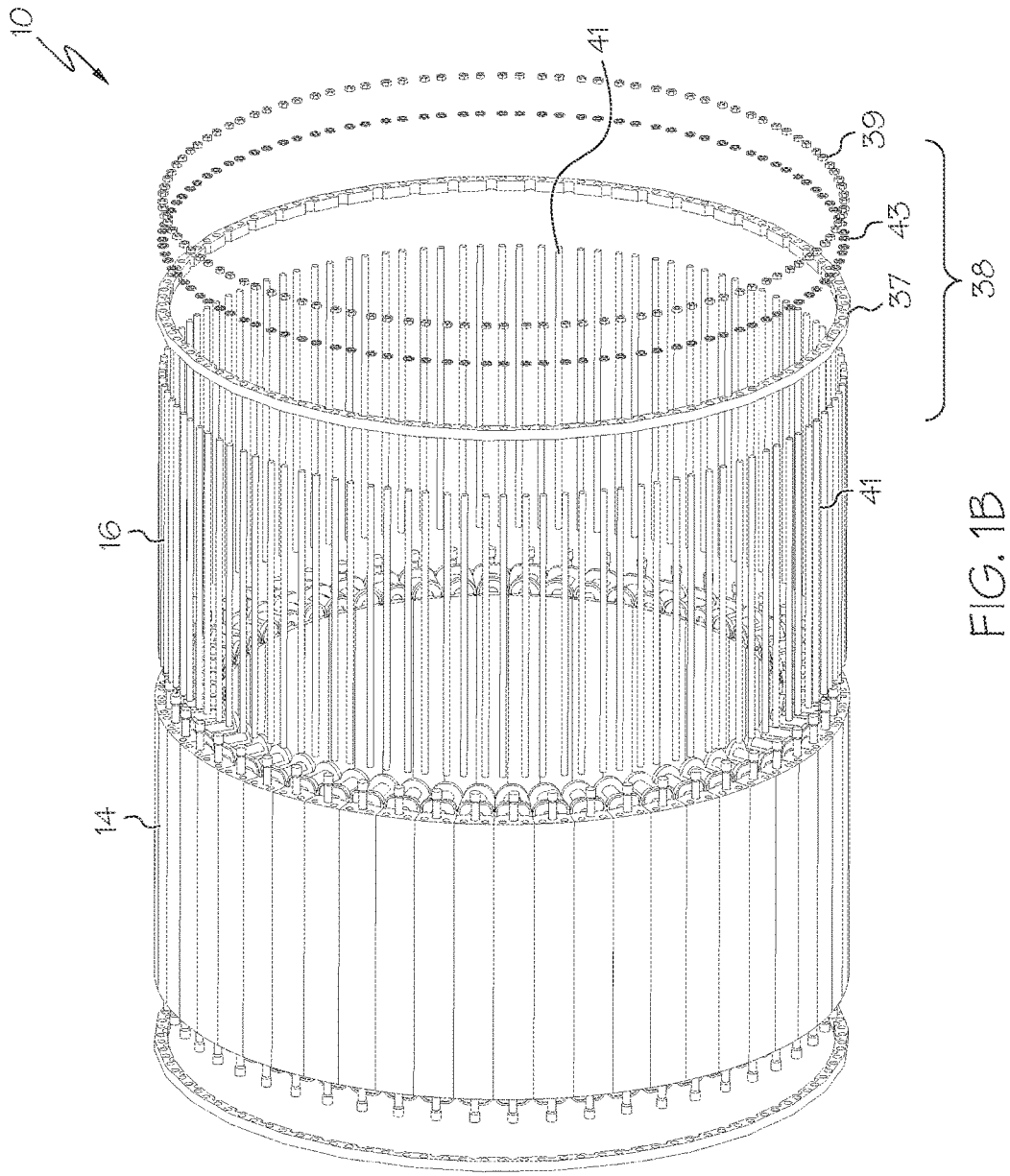
FIG. 1B is an exploded view of the stator of FIG. 1A.

FIG. 1A is a perspective view of a stator 10, in accordance with an embodiment. FIG. 1B is an exploded view of the stator 10 of FIG. 1A, in which a stator body 14 is shown separate from an arrangement 16 of a plurality of stator segments 22 in place, for example, an annular arrangement. A rotor (not shown) can be positioned in the stator 10, such that the stator segments 22 at least partially surround the rotor. The stator segments 22 can be equally spaced from each other about the circumferential inner surface of the stator 10.

Figure 3:
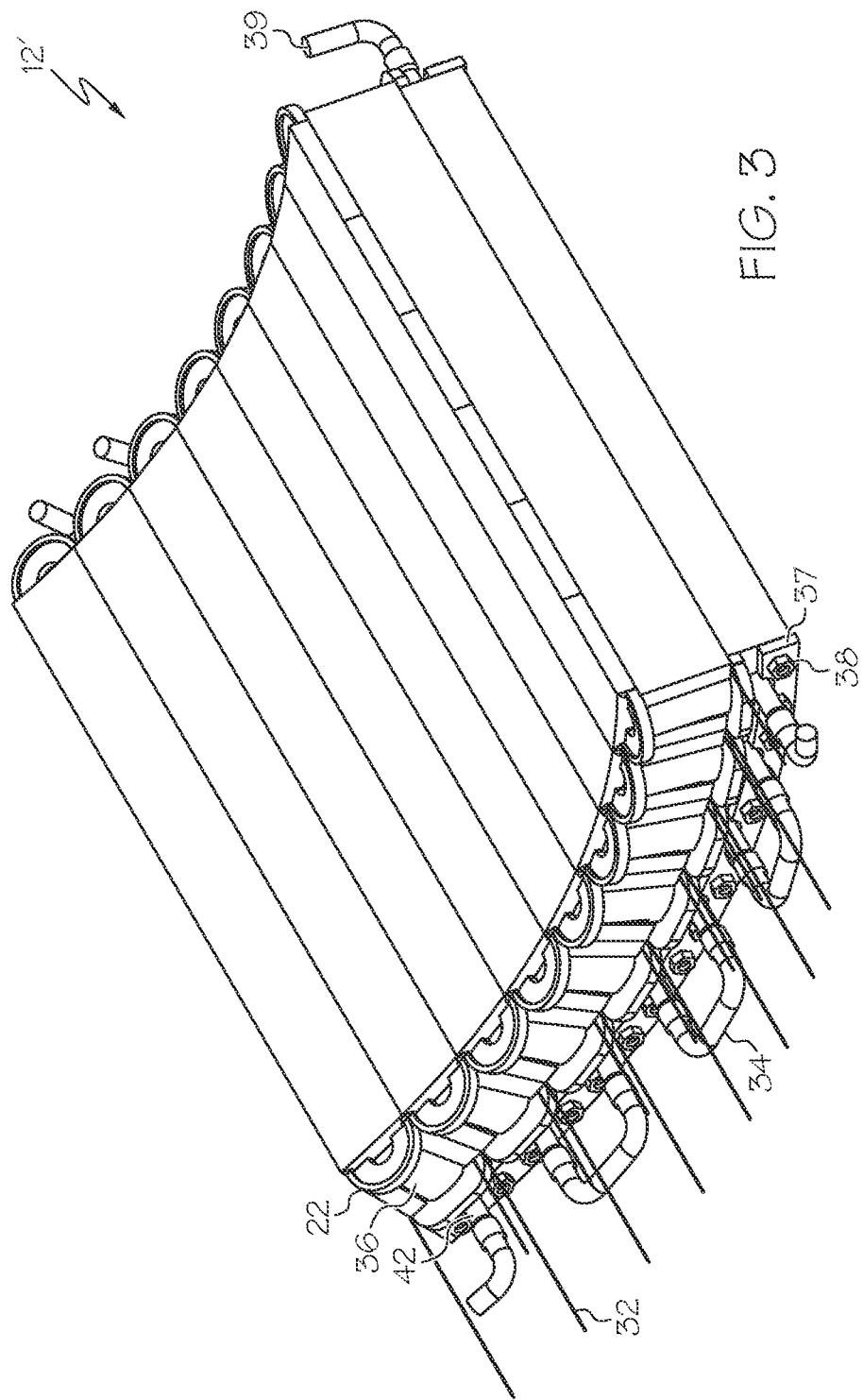
FIG. 3 is another expanded perspective view of a region of the stator of FIG. 1 including a plurality of stator segments connected to each other, in accordance with an embodiment.

FIG. 2 is an expanded perspective view of a region 12 of the stator 10 of FIG. 1A, the stator region 12 including a plurality of stator segments 22 connected to each other, in accordance with an embodiment. FIG. 3 is an expanded perspective view of a region 12' of the stator 10 of FIGS. 1 and 2, the stator region 12' including a plurality of stator segments 22 including winding wire terminals 32 and cooling tube extenders 34 coupled between adjacent stator segments 22, in accordance with an embodiment.

Each stator segment 22 is wound with conductive winding wire. An end portion 36 of a winding is shown, which can be covered by an insulating tape and the like. A plurality of border sections 44 (described in detail below) can be attached to top and/or bottom regions of the stator segment 22. In the embodiment of a stator region 12' shown in FIG. 3, an end 32 of the winding wire can be wrapped around a terminal extending from the stator segment 22. A cooling tube 42 can extend through the stator segment 22. A cooling tube extender 34 can be coupled between adjacent cooling tubes 42 so that a coolant can be exchanged between adjacent segments 22. The coolant can enter or exit the region 12' at a distal cooling tube portion 39.

Figure 4A:
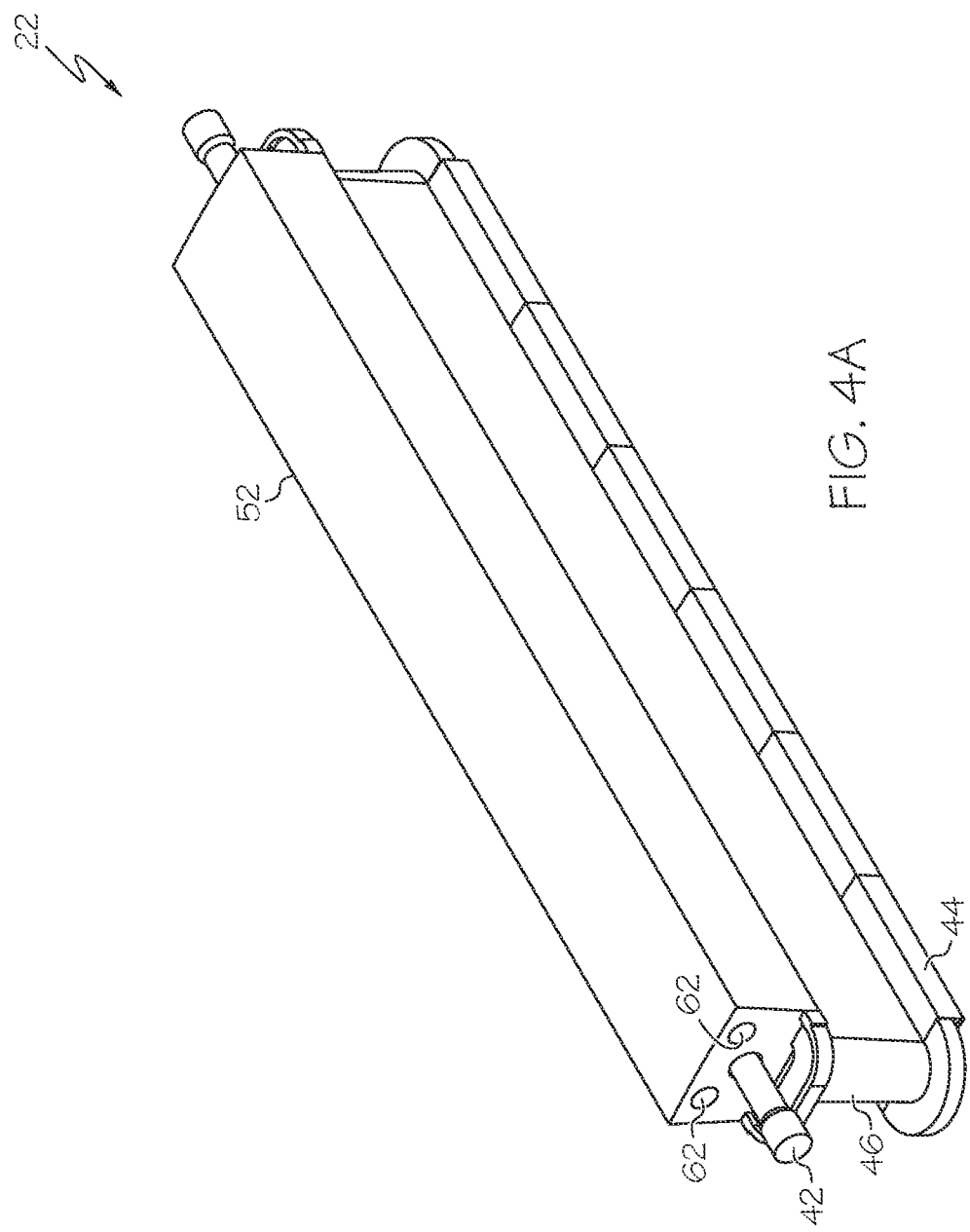
FIG. 4A is a perspective view of a stator segment, in accordance with an embodiment.
Figure 4B:
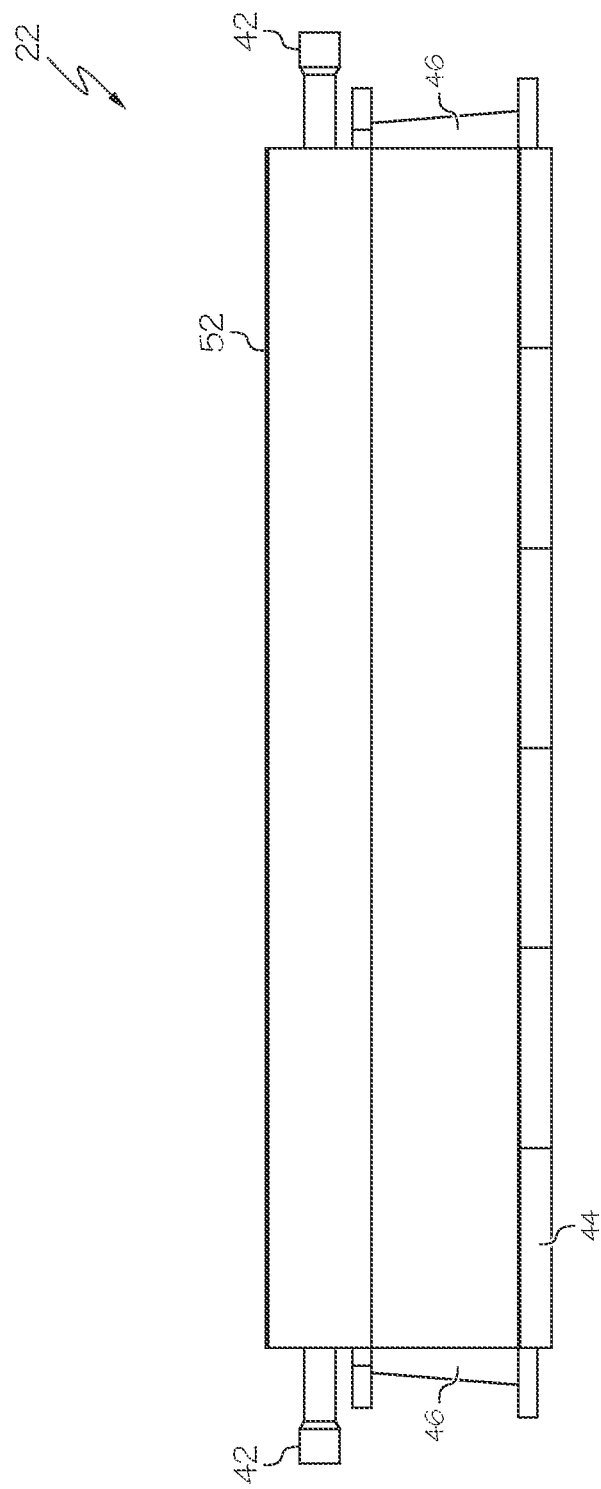
FIG. 4B is a side view of the stator segment of FIG. 4A.
Figure 6B:
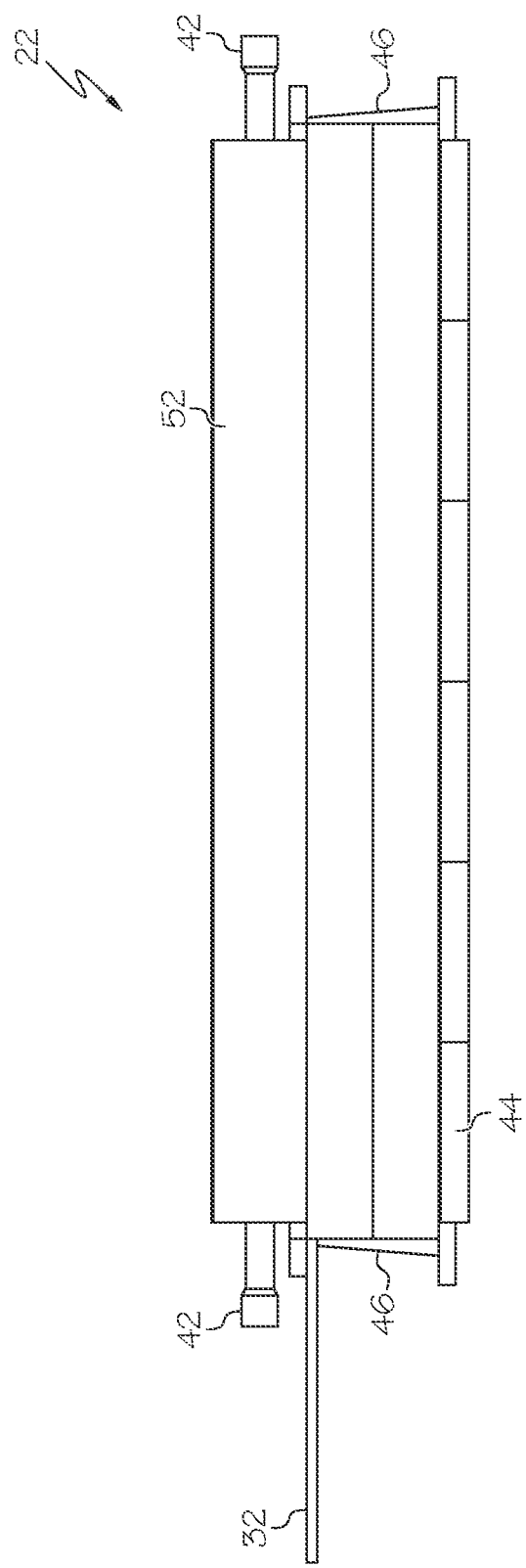
FIG. 6B is a side view of the stator segment of FIG. 6A.

FIG. 4A is a perspective view of a stator segment 22, in accordance with an embodiment. FIG. 4B is a side view of the stator segment 22 of FIG. 4A. FIG. 5 is an exploded view of the stator segment 22 of FIGS. 4A and 4B. FIG. 6A is a perspective view of a stator segment, in accordance with another embodiment. FIG. 6B is a side view of the stator segment 22 of FIG. 6A. The stator segments 22 shown in FIGS. 4A, 4B, 6A, and 6B, respectively, are substantially similar. The stator segment 22 can be part of the region 12 of FIG. 2 or part of the region 12' of FIG. 3.

Figure 7:
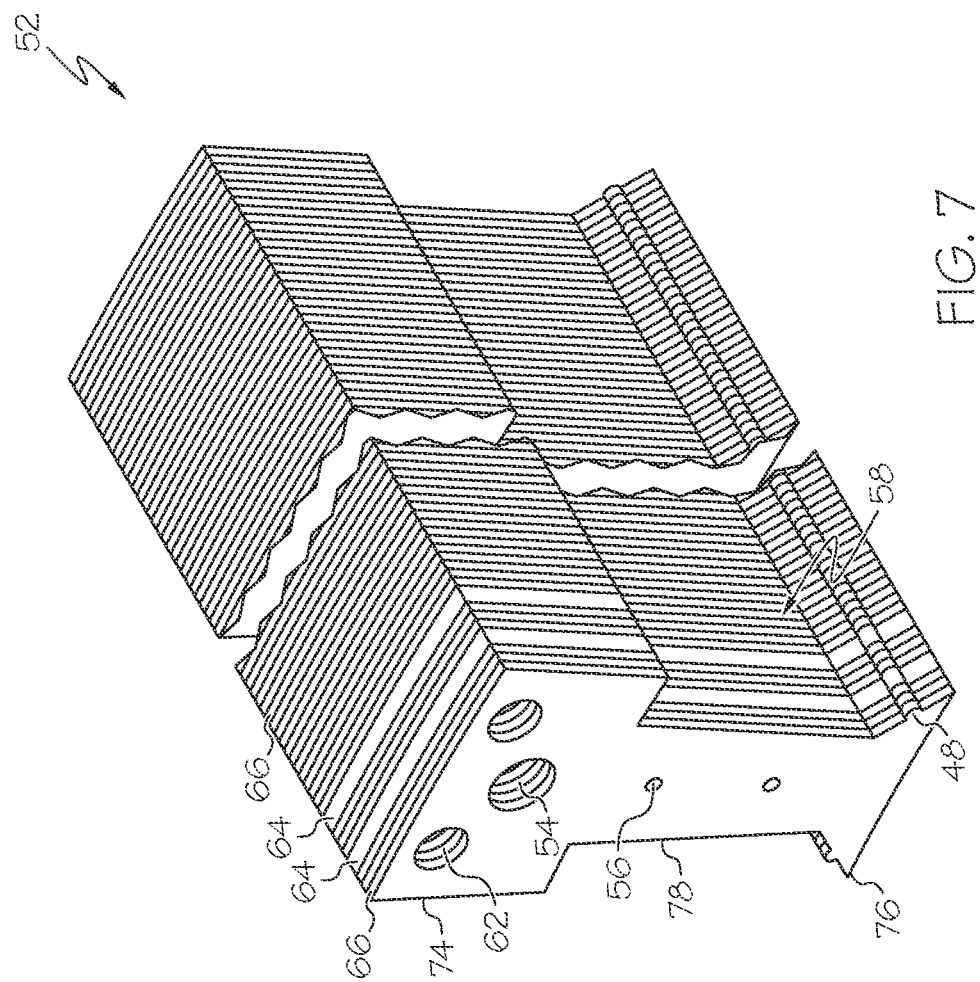
FIG. 7 is a perspective view of a stator segment core having a plurality of laminates, in accordance with an embodiment.

The stator segment 22 includes a segment core 52. The stator segment core 52 can include a plurality of laminates 66 having high magnetic permeable properties and a plurality of thermally conductive laminates 64 positioned between the permeable laminates 66, as shown in FIG. 7.

The stator segment core 52 has a proximal portion 74, a distal portion 76, and a central portion 78 extending between the proximal portion 74 and the distal portion 76. In an embodiment, the proximal portion 74 and the distal portion 76 are each wider than the central portion 78. In this manner, a plurality of windings 72 can be positioned in a cavity 58 formed at the central portion 78 between protrusions at the proximal portion 74 and the distal portion 76, respectively, by wrapping conductive wire about the stator segment core 52 to at least partially fill the cavity 58.

A cooling pipe hole 54 extends through the segment core 52 along a direction of extension of the stator segment 22. A cooling tube 42 can be positioned in the cooling pipe hole 54.

Mounting holes 62 can extend along the direction of extension of the stator segment 22 through at least a portion of the stator segment 22. The arrangement 16 can include a plurality of coupling mechanisms 38 (see FIG. 3) and a plurality of threaded studs 41 inserted in the mounting holes 62. A coupling mechanism 38 can be attached to each end of each stud 41. As shown in FIG. 1B, the coupling mechanisms 38 can include a plurality of hex nuts 39, washers 43, and a portion of a first ring 37 positioned about one end of the studs 41, and a second ring (not shown) threaded into an opposite end of the studs 41. The first and second rings 37 can secure the stator segment 22 at the annular arrangement 16.

The stator segment 22 can include an outer assembly that is attached to front, back, and/or side surfaces of the stator segment core 52. An end cap 46 can be attached to the front and/or back of the stator segment core 52. The end caps 46 can be formed of plastic or other material known to those of ordinary skill in the art. The end caps 46 can include rounded surfaces, permitting windings, or coil, to be wound about the stator segment core 52. One or more alignment holes 56 can at least partially extend through a front and/or back surface of the stator segment core 52. An end cap 46 can include one or more pins extending from the end cap 46 for insertion at the alignment holes 56.

A plurality of border sections 44 can be attached to top and/or bottom regions along a side of the stator segment core 52. The border sections 44, along with the end caps 46, can form a trim. The border sections 44 can be formed of plastic or other material known to those of ordinary skill in the art. The border sections 44 have a slot molded into the back thereof that interfaces with a nubbin or boss, for example, described herein. The windings can be held in place between top and corresponding bottom border sections 44.

A sheet of insulating material 68 can be constructed and arranged for positioning in the cavity 58 in the stator segment to prepare the segment for winding and ensure proper voltage standoff between the stator coils and the stator core 52. In particular, the insulating material 68 can cover the surfaces of the core 52 forming the cavity 58. The sheet 68 may be constructed from polyamide, aramid, or any other standard insulating material.

As shown in FIG. 7, the stator segment core 52 can include plurality of laminates 66 having high magnetic permeability and a plurality of thermally conductive laminates 64 positioned between the permeable laminates 66. The thermally conductive laminates 64 can be formed of copper, aluminum, pyrolytic graphite, or other thermally conductive material known to those of ordinary skill in the art. The permeable laminates 66 can be formed of steel, iron, or related material. The thermally conductive laminates 64 can be interposed between one or more permeable laminates 66 at equal intervals, for example, one thermally conductive laminate 66 positioned after every two permeable laminates 102. During formation, the thermally conductive laminates 64 and the permeable laminates 66 are stacked on each other, and press-fitted, glued, or bonded together.

The thermally conductive laminates 64 preferably have thermal conductivity or related characteristics greater than that of the permeable laminates 66, permitting the stator segment 22 to serve as a sink, or more efficiently direct heat from the coil to the cooling tube 42.

A cooling pipe hole 54 extends through the laminates 64, 66 along a direction of extension of the stator segment core 52. The cooling tube 42 can be positioned in the cooling pipe hole 52. The cooling tube is therefore placed in thermal contact with the laminates, in particular, the thermally conductive laminates 64. The placement of the cooling tube in direct contact with the laminates 64, 66 reduces the number of thermal interfaces in the path from the windings to the cooling tube as compared to conventional cooled housing configurations.

Each laminate 64, 66 can include a protrusion 48, also referred to as a nubbin or boss, extending from a tapered portion of a side surface. When the laminates 64, 66 are coupled together, the nubbins of the laminates 64, 66 are aligned with each other to form a single continuous nubbin along the direction of extension of the stator segment core 52.

Figure 8:
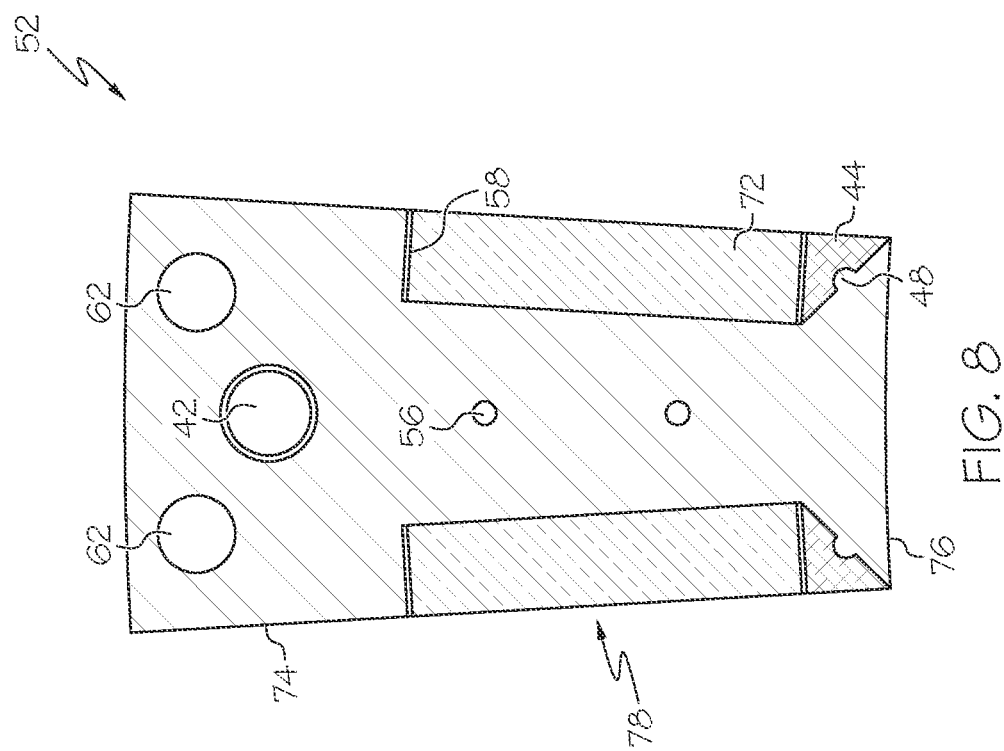
FIG. 8 is a cross-sectional front view of a stator segment, in accordance with an embodiment.
Figure 9:
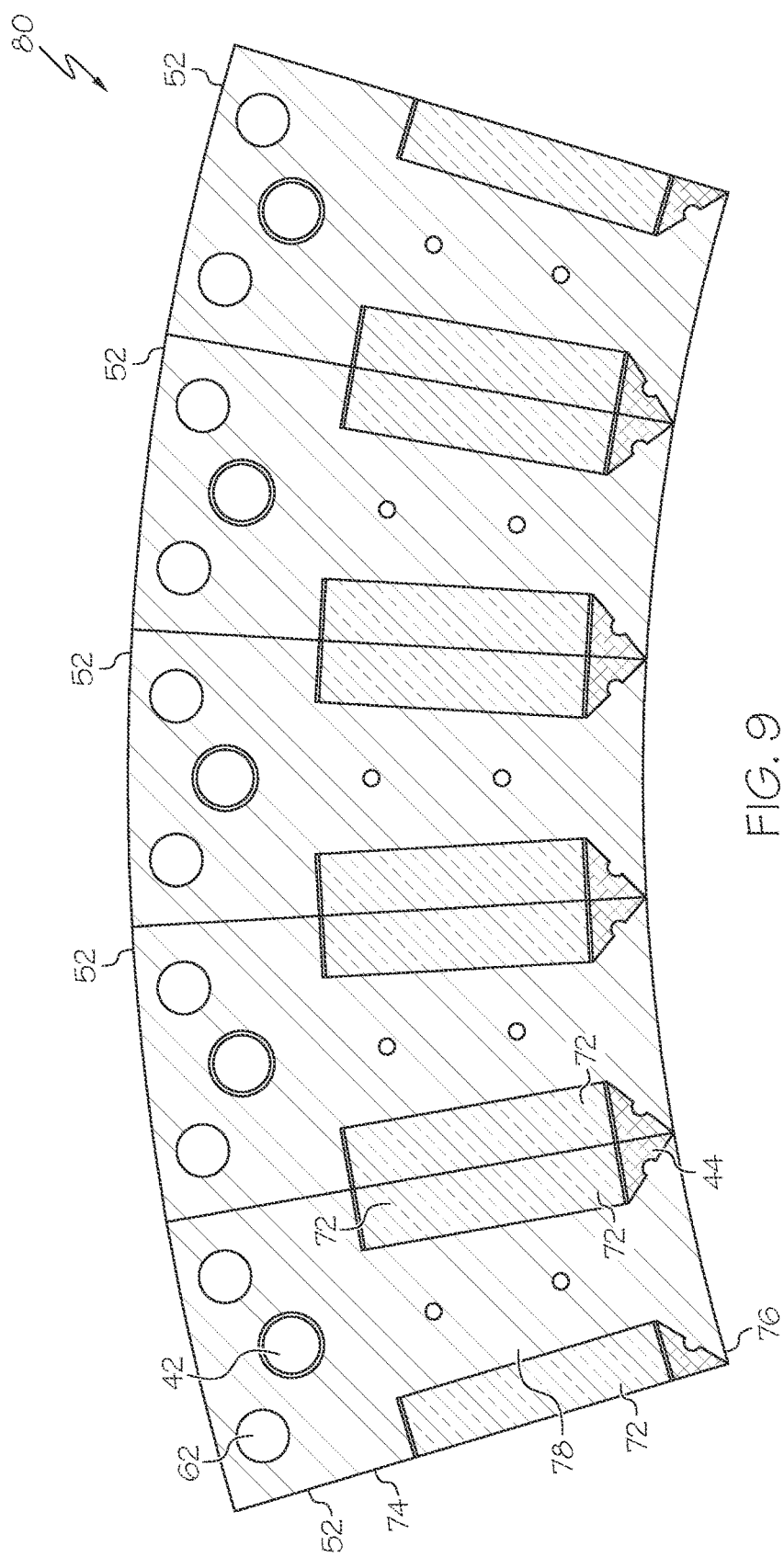
FIG. 9 is a cross-sectional front view of a plurality of stator segments connected to each other, in accordance with an embodiment.

As shown in FIG. 8, a plurality of border sections 44 can be constructed and arranged for positioning on the nubbin 48 to prevent windings 72 from slipping from its location about the stator segment core 52.

A plurality of stator segment cores 52 can be constructed and arranged to form a stator region, which can be similar to the stator regions 12, 12' described above. The cores 52 are constructed and arranged separately, wherein windings can occur at a segment level. The cores 52 can then be assembled, permitting sufficient spacing between adjacent cores 52 and achieving a high packing factor with respect to winding wire 72 at each core 52.

Figure 10B:
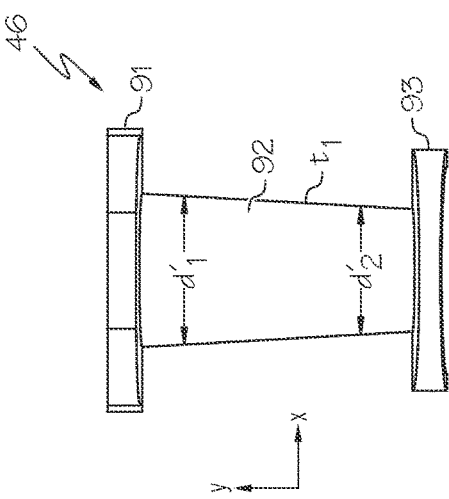
FIG. 10B is a front view of the stator segment end cap of FIG. 10A.
Figure 10A:
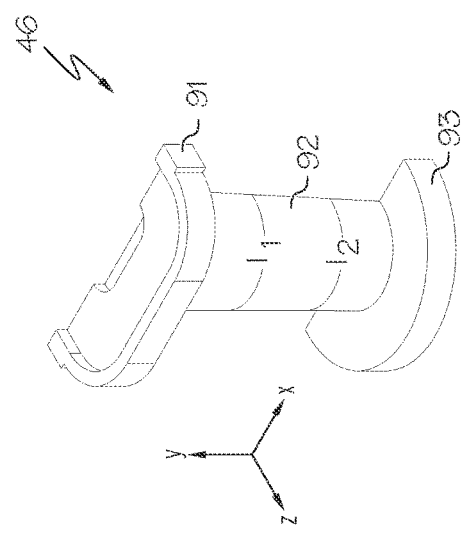
FIG. 10A is a perspective view of a stator segment end cap, in accordance with an embodiment.
Figure 10D:
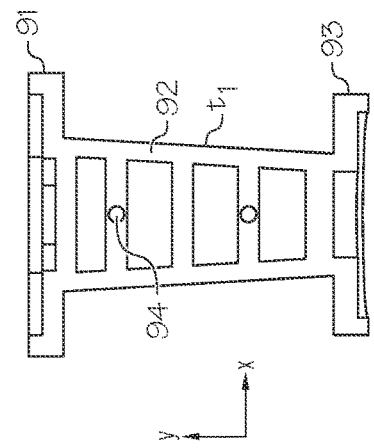
FIG. 10D is a rear view of the stator segment end cap of FIGS. 10A-10C.
Figure 10C:
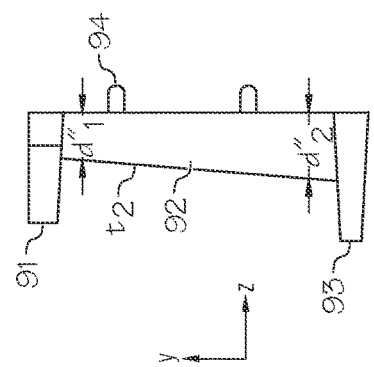
FIG. 10C is a side view of the stator segment end cap of FIGS. 10A and 10B.

FIG. 10A is a perspective view of a stator segment end cap 46, in accordance with an embodiment. FIG. 10B is a front view of the stator segment end cap 46 of FIG. 10A. FIG. 10C is a side view of the stator segment end cap 46 of FIGS. 10A and 10B. FIG. 10D is a rear view of the stator segment end cap 46 of FIGS. 10A-10C. The end cap 46 can be coupled to a stator segment, for example, as shown in FIGS. 4-6.

In an embodiment, the end cap 46 includes a top portion 91, a center portion 92, and a bottom portion 93. One or more pins 94 can protrude from the rear surface of the end cap 46. Each pin 94 can be positioned in a corresponding alignment hole 56 in the stator segment core 52.

In an embodiment, the center portion 92 of the end cap 46 has a dual-taper configuration. The first taper $t_1$ is shown in FIG. 10B, namely, a taper extending in a y direction between the first portion 91 and the third portion 93. Here, the center portion 92 is illustrated as having a first width $d_1'$ and a second width $d_2'$ in an x direction that is perpendicular to the y direction. As shown in FIG. 10B, the first width $d_1'$ is greater than the second width $d_2'$.

The second taper $t_2$ likewise extends in the y direction of the first center portion 92 between the first portion 91 and the third portion 93. Here, the center portion 92 has a third width $d_1''$ and a fourth width $d_2''$ in a z direction that is perpendicular to the y direction. As shown in FIG. 10C, the third width $d_1''$ is less than the second width $d_2''$.

A first arc length $l_1$ extends along a top region of the center portion 92, shown in FIG. 10A. A second arc length $l_2$ extends along a bottom region of the second portion 92, which is the same as or equivalent to the first arc length $l_1$. In order for the first arc length $l_1$ and the second arc length $l_2$ to be the same or similar, the center portion 92 is rounded, or of a parabolic shape that permits the center portion 92 to have a same or similar, or otherwise uniform, arc length from the first arc length $l_1$ to the second arc length $l_2$ in view of the two tapers $t_1$, $t_2$, as distinguished from conventional cone-shaped configurations, where such arc lengths are different, e.g., the top arc length is greater than the bottom arc length. The difference is widths between the first width $d_1'$ and the second width $d2'$, and between the third width $d_1''$ and the fourth width $d_2''$ can contribute to the equivalent length between the first arc length $l_1$ and the second arc length $l_2$.

Thus, the rounded surface of the end cap 46 having a uniform arc length from a top region to a bottom region of the end cap 46, permits windings, or coil, to each maintain a winding position of the end cap 46 and the stator segment core 52, for example, during a winding operation, with a reduced likelihood of the windings changing their position during operation, for example, sliding to the bottom region of the end cap 46 during or after the winding operation.

In accordance with the present invention, novel stators and methods for forming stator segments have been provided. While the present invention has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereto.

What is claimed is:
1. A stator segment, comprising:
   a core that includes a lamination stack, comprising:
   a plurality of magnetic permeable laminates;
   at least one thermally conductive laminate positioned between the magnetic permeable laminates;
   at least one cooling passage integral to, and extending through, the lamination stack, wherein a conduction path is formed that carries thermal energy through the lamination stack to the at least one cooling passage extending through the lamination stack; and
   an end cap having a semi-elliptical cross-section and a dual-taper, wherein the end cap has a uniform arc length from a top region of the end cap to a bottom region of the end cap, wherein the end cap is disposed on the core, wherein the dual-taper is in two perpen- dicular directions, and wherein the dual-taper maintains the uniform arc length from the top region to the bottom region of the end cap with the dual-taper in the two perpendicular directions such that a dimension of the semi-elliptical cross-section in one of the perpendicular directions continuously increases between the top region and the bottom region while a dimension of the semi-elliptical cross-section in the other of the perpendicular directions continuously decreases between the top region and the bottom region.

2. The stator segment of claim 1, wherein the at least one cooling passage includes a liquid cooling passage.

3. The stator segment of claim 1, further comprising a liquid cooling tube positioned in the at least one cooling passage for removing the thermal energy from the stator segment.

4. The stator segment of claim 3, wherein the liquid cooling tube includes a coolant, and wherein the thermal energy is transferred from the lamination stack to the coolant flowing through the liquid cooling tube.

5. The stator segment of claim 1, further comprising one or more coils wound about the core.

6. The stator segment of claim 5, further comprising a sheet of insulating material constructed and arranged for positioning in a cavity in the stator segment to prepare the segment for the winding of the one or more coils and to ensure a proper voltage standoff between the one or more coils and the core.

7. An annular stator assembly, comprising:
a plurality of stator segments, each stator segment comprising:
  a core comprising a plurality of laminates having high magnetic permeability and a plurality of thermally conductive laminates positioned between the permeable laminates;
  a cooling pipe integrated into the laminates for transferring thermal energy from the laminates to a coolant flowing through the cooling pipe; and
  an end cap having a semi-elliptical cross-section and a dual-taper, wherein the end cap has a uniform arc length from a top region of the end cap to a bottom region of the end cap, wherein the end cap is disposed on the core, wherein the dual-taper is in two perpendicular directions, and wherein the dual-taper maintains the uniform arc length from the top region to the bottom region of the end cap with the dual-taper in the two perpendicular directions such that a dimension of the semi-elliptical cross-section in one of the perpendicular directions continuously increases between the top region and the bottom region while a dimension of the semi-elliptical cross-section in the other of the perpendicular directions continuously decreases between the top region and the bottom region.

8. The stator assembly of claim 7, wherein the stator segments are constructed independently from each other, wherein one or more coils are wound at each segment, and wherein the wound coils are arranged to form one or more conductive paths of the annular stator assembly.

9. The stator assembly of claim 8, further comprising a sheet of insulating material constructed and arranged for positioning in a cavity in each stator segment to prepare the segment for the winding of coils and to ensure a proper voltage standoff between the coils and the core.

* * * * *